United States Patent
White, III et al.

(10) Patent No.: US 11,922,400 B2
(45) Date of Patent: Mar. 5, 2024

(54) SYSTEMS AND METHODS FOR ACTIVATING AND USING DYNAMIC CARDS

(71) Applicant: JPMorgan Chase Bank, N.A., New York, NY (US)

(72) Inventors: James P. White, III, Middletown, DE (US); Eric Han Kai Chang, Wilmington, DE (US); Howard Spector, Woolwich, NJ (US); William F Mann, III, Avondale, PA (US)

(*) Notice: Subject to any disclaimer, the term of this patent is extended or adjusted under 35 U.S.C. 154(b) by 0 days.

(21) Appl. No.: 16/003,205

(22) Filed: Jun. 8, 2018

(65) Prior Publication Data

US 2018/0357635 A1 Dec. 13, 2018

Related U.S. Application Data

(60) Provisional application No. 62/517,267, filed on Jun. 9, 2017.

(51) Int. Cl.
*G06Q 20/34* (2012.01)
*G06K 19/06* (2006.01)
*G06K 19/07* (2006.01)

(52) U.S. Cl.
CPC ..... *G06Q 20/354* (2013.01); *G06K 19/06028* (2013.01); *G06K 19/06187* (2013.01); *G06K 19/0723* (2013.01); *G06Q 20/341* (2013.01)

(58) Field of Classification Search
CPC .... G06Q 20/354; G06Q 20/341; G06Q 20/00; G06Q 20/08; G06Q 20/085; G06Q 20/0855; G06Q 20/105; G06Q 20/1085; G06Q 20/145; G06Q 20/34; G06Q 20/343; G06Q 20/3433; G06Q 20/348; G06Q 20/349; G06Q 20/352; G06Q 20/355; G06Q 20/357; G06Q 20/3572; G06Q 20/3574; G06Q 20/3576; G06Q 20/35765;

(Continued)

(56) References Cited

U.S. PATENT DOCUMENTS

| 2002/0190118 A1* | 12/2002 | Davenport | G07F 7/025 235/375 |
| 2004/0135671 A1* | 7/2004 | Khoshbin | G06Q 20/40 340/7.53 |

(Continued)

OTHER PUBLICATIONS

U.S. Appl. No. 15/957,331, filed Apr. 2018, Spector.

(Continued)

*Primary Examiner* — Edward Chang
*Assistant Examiner* — Divesh Patel
(74) *Attorney, Agent, or Firm* — GREENBERG TRAURIG LLP

(57) ABSTRACT

Systems and methods for activating and using dynamic cards are disclosed. In one embodiment, in an information processing apparatus comprising at least one computer processor, a method for activating a dynamic transaction instrument may include: (1) receiving, from an electronic device, an identification of an inactive financial instrument to activate; (2) receiving, from the electronic device, at least one parameter that restricts the use of the inactive financial instrument after it is activated; and (3) activating the inactive financial instrument subject to the at least one parameter by associating, at a backend, an account with the inactive financial instrument.

16 Claims, 2 Drawing Sheets

(58) Field of Classification Search
CPC ......... G06Q 20/3578; G06Q 20/35785; G06Q 20/40; G06Q 20/401; G06Q 20/405; G06Q 20/409; G06K 19/06028; G06K 19/06187; G06K 19/0723; G06K 19/00
See application file for complete search history.

(56) References Cited

U.S. PATENT DOCUMENTS

| | | | | |
|---|---|---|---|---|
| 2004/0230610 | A1* | 11/2004 | Gutierrez-Sheris | G06Q 20/04 |
| 2005/0242193 | A1* | 11/2005 | Smith | G07F 7/086 |
| | | | | 235/487 |
| 2008/0255947 | A1 | 10/2008 | Friedman | |
| 2009/0037173 | A1* | 2/2009 | Hansen | G06Q 20/341 |
| | | | | 704/E15.001 |
| 2009/0037333 | A1* | 2/2009 | Flitcroft | G06Q 20/342 |
| | | | | 705/44 |
| 2012/0259716 | A1 | 10/2012 | Rosenberger | |
| 2012/0310760 | A1 | 12/2012 | Phillips et al. | |
| 2013/0166441 | A1* | 6/2013 | Kobylkin | G06Q 20/348 |
| | | | | 705/35 |
| 2013/0268430 | A1* | 10/2013 | Lopez | G07F 17/42 |
| | | | | 705/39 |
| 2014/0058950 | A1 | 2/2014 | Gupta | |
| 2015/0324766 | A1 | 11/2015 | Park et al. | |
| 2015/0332246 | A1 | 11/2015 | Lafeer et al. | |
| 2016/0192123 | A1 | 6/2016 | Lim | |
| 2016/0197885 | A1 | 7/2016 | Cismas et al. | |
| 2016/0277868 | A1* | 9/2016 | Niles | H04W 4/50 |
| 2017/0018001 | A1* | 1/2017 | Tunnell | G06Q 30/0269 |
| 2017/0140385 | A1 | 5/2017 | Dobson et al. | |
| 2018/0005227 | A1* | 1/2018 | Sandelov | G06Q 20/341 |
| 2018/0012211 | A1* | 1/2018 | Singhal | G06K 19/06178 |
| 2018/0240094 | A1 | 8/2018 | Perez et al. | |
| 2018/0240108 | A1 | 8/2018 | Boss et al. | |
| 2018/0276672 | A1* | 9/2018 | Breed | G06Q 20/34 |
| 2018/0315038 | A1 | 11/2018 | Rezayee et al. | |
| 2019/0340604 | A1 | 11/2019 | Nadella et al. | |

OTHER PUBLICATIONS

International Search Report and Written Opinion of the International Searching Authority, dated Aug. 23, 2018, from corresponding International Application No. PCT/US2018/034608.

Woyke; Elizabeth, PayPal's Coolest Mobile Wallet Feature: The Oops Button, Nov. 1, 2011, Forbes.

* cited by examiner

SYSTEMS AND METHODS FOR ACTIVATING AND USING DYNAMIC CARDS

RELATED APPLICATIONS

This application claims priority to U.S. Provisional Patent Application Ser. No. 62/517,267, filed Jun. 9, 2017. The disclosures of this document is hereby incorporated, by reference, in its entirety.

BACKGROUND OF THE INVENTION

1. Field of the Invention

The present disclosure generally relates to systems and methods for activating and using dynamic cards.

2. Description of the Related Art

Stored value card are often given as gifts. To activate a card, a customer usually selects a stored value card and presents the card to a cashier. The stored value card may have a set value (e.g., $25), or it may allow the customer to select an amount. The cashier then scans or enters a code on the card, and the card is activated and "loaded" with the desired funds.

SUMMARY OF THE INVENTION

Systems and methods for activating and using dynamic cards are disclosed. In one embodiment, in an information processing apparatus comprising at least one computer processor, a method for activating a dynamic transaction instrument may include: (1) receiving, from an electronic device, an identification of an inactive financial instrument to activate; (2) receiving, from the electronic device, at least one parameter that restricts the use of the inactive financial instrument after it is activated; and (3) activating the inactive financial instrument subject to the at least one parameter by associating, at a backend, an account with the inactive financial instrument.

In one embodiment, the identification of the inactive financial instrument may be received as a barcode, as an alphanumeric identifier, etc.

In one embodiment, the inactive financial instrument may be a paper-based substrate and at least one of a magnetic stripe, an EMV chip, and a NFC chip.

In one embodiment, the electronic device may include a mobile electronic device executing a computer application, a kiosk, an ATM, etc.

In one embodiment, the parameter may include an identification of a funding account and a funding amount, a date or time restriction, a merchant restriction, a geographical restriction, a use restriction, etc.

In one embodiment, the method may further include funding the account with the funding amount from the funding account.

In one embodiment, the method may further include linking the account to a credit account.

In one embodiment, the inactive financial instrument may be activated as a credit-based instrument, as a stored-value instrument, etc.

In one embodiment, the method may further include activating the EMV chip.

In one embodiment, the method may further include generating a cryptogram and a token for the activated financial instrument.

In one embodiment, the method may further include notifying a requestor following activation of the financial instrument. The notification may be sent by SMS.

In one embodiment, the method may further include receiving a request for a second funding request for the activated financial instrument; communicating, to an electronic device associated with an owner of the funding account, a request for approval of the second funding request; receiving, from the electronic device associated with the owner of the funding account, approval; and funding the account with the second funding amount.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
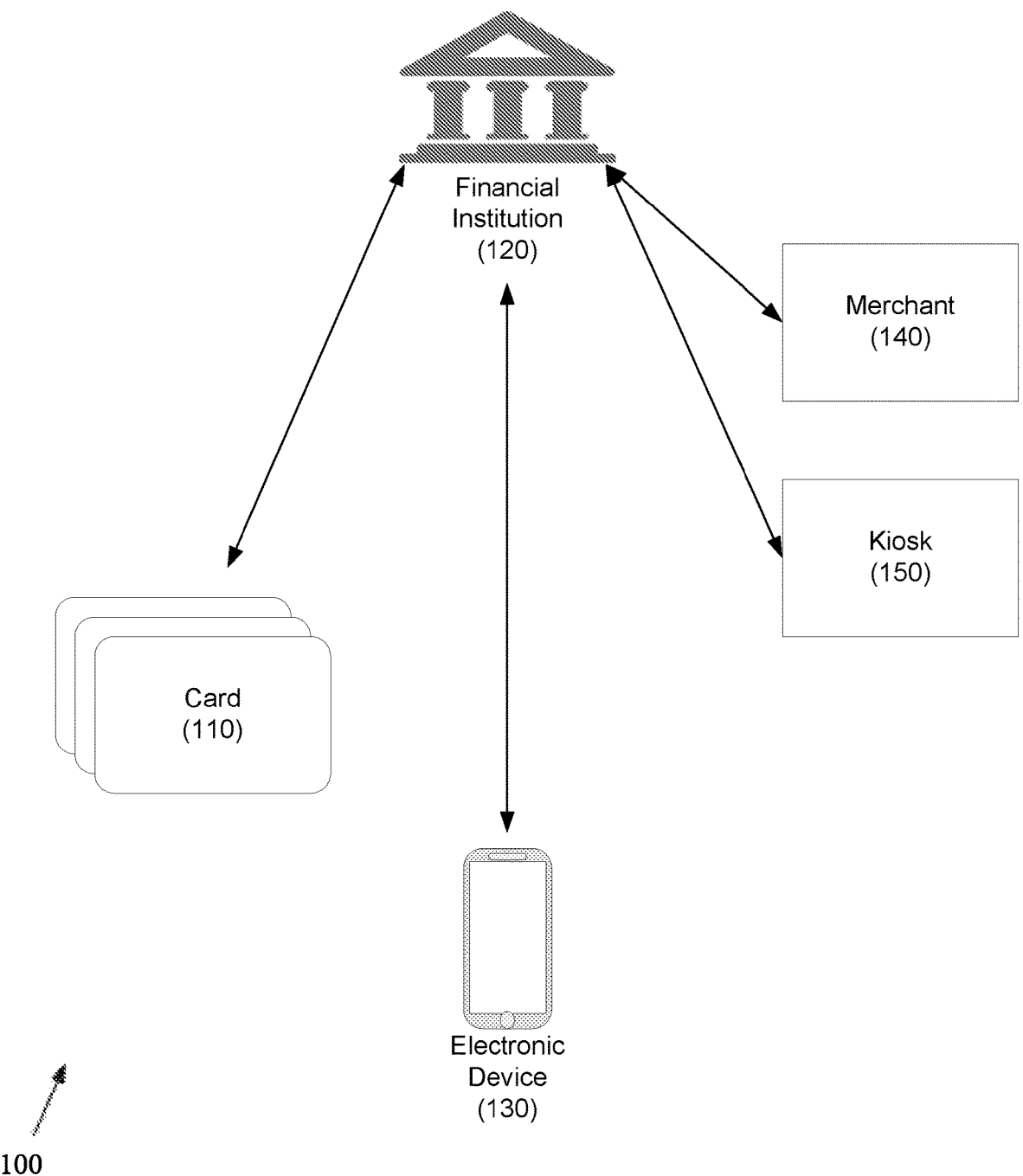
FIG. 1 depicts a system for activating and using dynamic cards according to one embodiment.

Embodiments disclosed herein relate to systems and methods for activating and using dynamic cards.

In one embodiment, an account owner may order financial instruments, such as credit cards, from an issuer. The credit cards may include all standard features of a credit card, such as a magnetic stripe, an EMV chip, an account number, an expiration date, a CVV number, etc. The account owner may activate the cards as desired, may set up usage rules and limitations (see below), and then use the cards in the same manner as a standard credit card. In one embodiment, the spend against the cards may be routed to one or more specified accounts. In one embodiment, the accounts may still earn points/miles/rewards.

The disclosures of U.S. Patent Application Ser. No. 62/487,025 and U.S. patent application Ser. No. 15/957,331 are hereby incorporated, by reference, in their entireties.

In one embodiment, a financial instrument, such as a card, may be made of cardboard, metal, plastic, or other commonly used materials. In one embodiment, the card may be disposable. It may include a magnetic stripe, a EMV chip, and other common security features. In one embodiment, a set of cards could be bundled together, such as a deck of cards, a punch-out sheet of cards, etc.

In one embodiment, usage rules and limitations may be adjusted as necessary and/or desired using a mobile device, a computer, an ATM, a telephone interactive response system, etc.

In one embodiment, the cards may be activated using a mobile electronic device, desktop computer, an ATM, a kiosk, over the phone, etc. by scanning a machine-readable code (e.g., a QR code), swiping the magnetic stripe, presenting the EMV chip, using NFC, RFID, etc., by entering the card number, etc. Any suitable manner of activating the card may be used as is necessary and/or desired.

In one embodiment, each card may have a spending limit that may be adjusted as is necessary and/or desired.

In one embodiment, the card may be a stored value card, and may be loaded with a set amount of funds. The amount of funds may be changed (e.g., added, subtracted, etc.) as is necessary and/or desired. In one embodiment, the card and/or the funds stored on the card may be linked to a funding source (e.g., a credit card, account, etc.). For example, the funds on a card functioning as a stored value card may have an expiration date which may set by the user and changed as is necessary and/or desired. Upon expiration, the funds on the card may revert to the funding account. As another example, if the card is lost or stolen, the cardholder may have card voided and the funds may revert to the funding account.

In one embodiment, the card may have a fixed credit limit that may be set by the customer, by the issuing financial institution, etc. In one embodiment, the card may be reloaded from the associated funding account upon request to and approval from the holder of the funding account.

In one embodiment, the card may be subject to spending rules and/or limits that may specify when, where, with whom, and for what the card may be used. Examples include a time and/or date restriction, a location restriction, a merchant or type of merchant restriction (e.g., a whitelist, blacklist, etc.), restrictions on a type of good or service that can be purchased, etc.

Exemplary embodiments are provided below.

In one example, a customer may create a set of stored value "gift cards." In one embodiment, the created gift cards may be used with any merchant; in another embodiment, they may be limited to a specific merchant.

In another example, a customer may create a refillable allowance card for his or her children. In one embodiment, the card may be automatically refilled or have funds added on a periodic basis (e.g., weekly).

In another example, a customer may create an emergency card that may be used by a friend/family in an emergency situation.

In another example, a customer may create a travel card with stored value funds or with a limited credit limit to be used during a vacation, during international travel, etc.

In another example, the customer may create an on-line only card to be used for online transactions. This may be for all on-line transactions, or for a specific merchant (e.g., an Amazon on-line card). This may reduce the need to change card numbers with a number of merchants should the primary card be compromised.

Referring to FIG. 1, a system for activating and using dynamic cards is disclosed according to one embodiment. System 100 may include one or more dynamic card 110, one or more financial institution 120, electronic device 130, and card activation/access points (e.g., merchant 140, kiosk 150).

In one embodiment, dynamic card 110 may be made of cardboard, metal, plastic, or other commonly used materials. In one embodiment, dynamic card 110 may include a magnetic stripe, a EMV chip, and other common security features.

Financial institution 120 may be an issuer of dynamic card 110. In one embodiment, financial institution 120 may also fund dynamic card 110; in another embodiment, a second financial institution (not shown) may fund dynamic card 110.

Electronic device 130 may be any suitable electronic device, including, for example, computers, smartphones, smart watches, Internet of Things (IoT) appliances, etc. In one embodiment, electronic device 130 may manage dynamic card 110 by, for example, activating, deactivating, funding, defunding, setting restrictions, etc.

In one embodiment, electronic device 120 may execute a computer program or application that may be used to manage dynamic card 110.

In one embodiment, dynamic card 110 may be managed via card activation/access points (e.g., merchant 140, kiosk 150, an ATM (not shown)).

Figure 2:
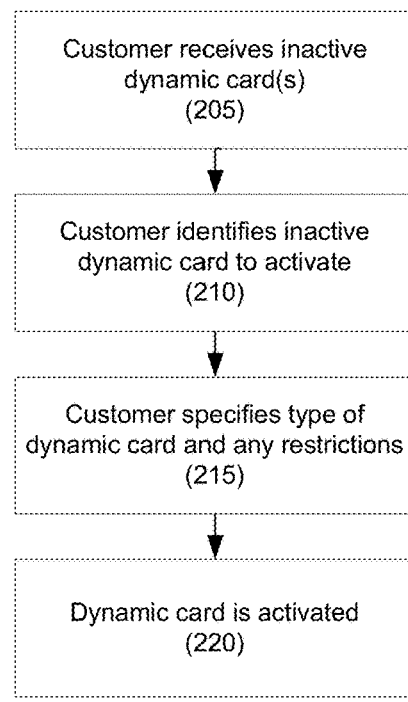
FIG. 2 depicts a method for activating and using dynamic cards according to one embodiment.

Referring to FIG. 2, a method for activating and using dynamic cards is disclosed according to one embodiment. In step 205, a customer may receive one or more inactive dynamic cards. In one embodiment, the dynamic card be made of cardboard, metal, plastic, or other commonly used materials. In one embodiment, the dynamic card may include a magnetic stripe, a EMV chip, and other common security features.

In step 210, a customer may identify or select an inactive dynamic card to activate. In one embodiment, the customer may provide an identifier for the dynamic card to a financial instrument (e.g., an issuer). For example, the customer may enter an identifier (e.g., a card number), scan a machine-readable code (e.g., a bar code, QR code, etc.), take an image of the dynamic card, swipe a magnetic stripe, have an EMV chip read, have a NFC code read, etc. In one embodiment, the customer may use a mobile electronic device, computer, IoT appliance, ATM, kiosk, point of sale device, etc., to provide the identifier.

In step 215, the customer may specify one or more parameters and/or restrictions for the dynamic card. For examiner, the customer may specify whether the dynamic card is to be activated as a credit, debit, or stored value instrument; a funding amount (if applicable); a spending limit; date and/or time restrictions, geographic restrictions, merchant restrictions, goods/services restrictions, and any other more parameters and/or restrictions as is necessary and/or desired.

In step 220, the financial institution may activate the dynamic card according to the parameters and/or restrictions. In one embodiment, the financial institution may fund the dynamic card; in another embodiment, a second financial institution may fund the dynamic card. In still another embodiment, the dynamic card may be linked to a credit card.

In one embodiment, the financial institution may send identifying information for the dynamic card to a back end for the financial institution. In one embodiment, the back end may activate the EMV chip.

In one embodiment, the back end may generate a cryptogram and token for the dynamic card. In one embodiment, the key required to generate the cryptogram may be provided by the issuing system to the backend that is creating the cryptogram.

In one embodiment, once funded, additional funds may be added to the dynamic card. For example, a holder of the dynamic card may request funding from the owner of a funding account. This may be done using, for example, a computer application executed by the issuing financial institution.

Next, the owner of the funding account may receive a message (e.g., SMS, message within an app, etc.) notifying the owner of the request for funds. The owner may then approve or disapprove the request.

If the request is approved, the funds may be transferred to the dynamic card. If the request is denied, the holder of the dynamic card may be notified that the request was denied.

In one embodiment, the customer may assign some, or all, of the funds or credit associated with the dynamic card to another customer, one or more devices (e.g., an electronic device, an IoT device, etc.). In another embodiment, the customer may at least a portion of the funds or credit associated with the dynamic card to one or more devices (e.g., an electronic device, an IoT device, etc.). For example, the customer may assign a dynamic card to a vehicle, and may permit transactions for fuel/electricity, maintenance, tolls, taxes, entertainment, etc. In one embodiment, the account may be temporarily granted to the vehicle, and any user of the vehicle (e.g., a family member) may be able to use the account.

As another example, the customer may request that a certain amount of funds be assigned to an account associated with a video game system.

In one embodiment, the account may be suspended if someone unauthorized uses the device.

In one embodiment, on-going charges may be registered and delivered to the customer's electronic device (e.g., phone, tablet, personal internet instance, etc.).

In one embodiment, a dynamic card may interact with IoT devices that may be present at a location, such as a hotel room, personal dwelling, dorm room, personal work station, restaurant table, aircraft seat, cruise ship, train, bus, etc. This may be in addition to its use as a transaction instrument. For example, if the customer user the dynamic card with a certain vendor or merchant, customer preferences may be automatically communicated to any IoT devices associated with the vendor or merchant. Example customer preferences include temperature, humidity, light level, subscriptions, news channels, rewards preferences, language, fonts, ads, formats, art, sound levels and pictures for transportation, dwelling, restaurants, personal space environments, etc.

In one embodiment, this may encourage the customer to use the card with vendors or merchants that provide this service.

Exemplary use cases are as follows. For a customer's hotel room, the customer may want the walls to be a specific shade of blue, 68 degrees F., 30% humidity with a gentle breeze, light Classical music in the background and the light level at 60 lumens, with a bed of medium hardness, chair with footrest of certain height. When the customer pays for the hotel room with the card, the IoT devices set are set to comply with the preferences.

For a customer's vehicle, the customer may pay a premium to have a certain type of vehicle that meets the customer at a specific time each morning and delivers the customer to work. For example, the customer may also want the customer's electronic device to track the route and progress, have the temperature set at 68 degrees F., have the windows tinted at 40%, have the radio set to a specific channel. When the customer uses the dynamic card to request or to pay for the vehicle, upon arrival, the vehicle is automatically configured as requested.

If the preferences are not available, the customer may get a discount, greater rewards, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for activating a dynamic transaction instrument, comprising:

receiving, by a computer program for an issuer of a dynamic financial instrument and from an electronic device, an identification of an inactive dynamic financial instrument to activate comprising information from a scan of a component of the inactive dynamic financial instrument selected from the group consisting of a machine-readable code, a magnetic stripe, a Europay, Mastercard, and Visa (EMV) chip, or a Near Field Communication (NFC) chip, wherein the inactive financial instrument is configured to be activated as any of a plurality of card types comprising a credit card, a debit card, and a stored value card;

receiving, by the computer program and from the electronic device, a specification of the card type for the activation;

receiving, by the computer program and from the electronic device, at least one parameter that restricts a use of the dynamic financial instrument after it is activated;

receiving, by the computer program and from the electronic device, a funding account and a funding amount for the dynamic financial instrument;

activating, by the computer program, the inactive dynamic financial instrument as the specified card type and subject to the at least one parameter;

confirming, by the computer program, approval to fund the activated dynamic financial instrument via Short Messaging Service (SMS) or in-application message to the electronic device;

in response to the SMS or in-application message, receiving, by the computer program and from the electronic device, approval to fund the activated dynamic financial instrument;

in response to the approval, funding, by the computer program, the activated dynamic financial instrument with the funding amount from the funding account;

communicating, by the activated dynamic financial instrument, a customer preference for operation of an internet of things (IoT) device associated with a merchant and provided at a merchant location;

implementing, by the IoT device, the customer preference; and returning, by the computer program, an unused funding amount stored on the activated dynamic financial instrument to the funding account upon expiration of the activated financial instrument.

2. The method of claim 1, wherein the electronic device comprises a mobile electronic device executing a computer application.

3. The method of claim 1, wherein the electronic device comprises a kiosk.

4. The method of claim 1, wherein the electronic device comprises an Automated Teller Machine (ATM).

5. The method of claim 1, wherein the parameter comprises a date or time restriction.

6. The method of claim 1, wherein the parameter comprises a merchant restriction.

7. The method of claim 1, wherein the parameter comprises a geographical restriction.

8. The method of claim 1, wherein the parameter comprises a use restriction.

9. The method of claim 1, further comprising:
activating the EMV chip.

10. The method of claim 1, further comprising:
generating a cryptogram and a token for the activated dynamic financial instrument.

11. The method of claim 1, further comprising:
notifying a requestor following activation of the dynamic financial instrument.

12. The method of claim 1, further comprising:
receiving a request for a second funding request for the activated dynamic financial instrument;
communicating, to an electronic device associated with an owner of the funding account, a request for approval of the second funding request;
receiving, from the electronic device associated with the owner of the funding account, approval; and
funding the activated dynamic financial instrument with a second funding amount.

13. The method of claim 1, wherein the customer preference that is received from the activated dynamic financial instrument comprises a temperature preference, a light level preference, or a sound level preference.

14. The method of claim 1, wherein the customer preference that is received from the activated dynamic financial instrument comprises a language preference for communicating with the IoT device.

15. The method of claim 1, wherein the customer preference that is received from the activated dynamic financial instrument comprises an art preference displayed by the IoT device.

16. The method of claim 1, wherein the customer preference that is received from the activated dynamic financial instrument comprises a window tint preference.

* * * * *